Feb. 13, 1940.  J. NEUFELD  2,190,038
POSITION AND DIRECTION DETERMINING SYSTEM
Filed June 25, 1937  4 Sheets-Sheet 1

INVENTOR
Jacob Neufeld

FIG.3

Feb. 13, 1940.    J. NEUFELD    2,190,038
POSITION AND DIRECTION DETERMINING SYSTEM
Filed June 25, 1937    4 Sheets-Sheet 3

INVENTOR
Jacob Neufeld

Feb. 13, 1940.    J. NEUFELD    2,190,038
POSITION AND DIRECTION DETERMINING SYSTEM
Filed June 25, 1937     4 Sheets-Sheet 4

INVENTOR
Jacob Neufeld

Patented Feb. 13, 1940

2,190,038

UNITED STATES PATENT OFFICE 2,190,038

POSITION AND DIRECTION DETERMINING SYSTEM

Jacob Neufeld, Tulsa, Okla.

Application June 25, 1937, Serial No. 150,286

18 Claims. (Cl. 250—11)

My invention relates to a device for visually indicating the bearings of an aircraft in flight, and more particularly to a device conveying the information as to the instantaneous position of the craft in the simplest possible manner.

In the arrangements heretofore used the position finding required considerable manipulation by an operator in that he must first tune his direction finder to the station from which signals are received, turn his loop until no signal is received, determine the sense or direction, then repeat the same manipulations with regard to other transmitting stations, and from the information thus received to determine his geographical position.

It is an object of the present invention to obviate the inconveniences of the prior art and to provide an improved method and apparatus that will indicate continuously the position of a craft with respect to one or to a plurality of transmitting stations.

It is another object of the present invention to devise a reliable radio compass comprising a fixed directional aerial, that will operate automatically and indicate continuously the direction of the course of the craft with regard to one or to a plurality of radio transmitting stations located on the territory above which the craft is flying.

It is another object of my invention to provide an arrangement including a map of the referred to territory and enabling the operator to determine instantly the position of the craft on the map from the directional indications of the course of the craft with regard to a plurality of fixed radio transmitting stations.

It is another object of my invention to devise a reliable radio compass comprising a fixed directional aerial that will operate automatically and indicate continuously and at all times by visual indicating means the angular relationship between the course of the craft and the position of the transmitting station to which the radio compass is tuned.

It is another object of my invention to provide a navigational chart in combination with an automatic direction finder and a method of determining the vessel's course and position on the navigational chart.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which:

My invention consists broadly in a method of determining angles of incidence of radiant energy emanating from a plurality of single sources of radiation, comprising simultaneously receiving the signal energy from each source by at least two separate and similar directional antennae having their line of maximum and minimum receptivity in different directions, continuously and separately amplifying the received signals by balanced amplifiers, continuously and separately measuring the output potentials of the amplifiers and determining their ratio, and indicating the direction of each source of radiation as a function of the said ratio.

Figure 1:
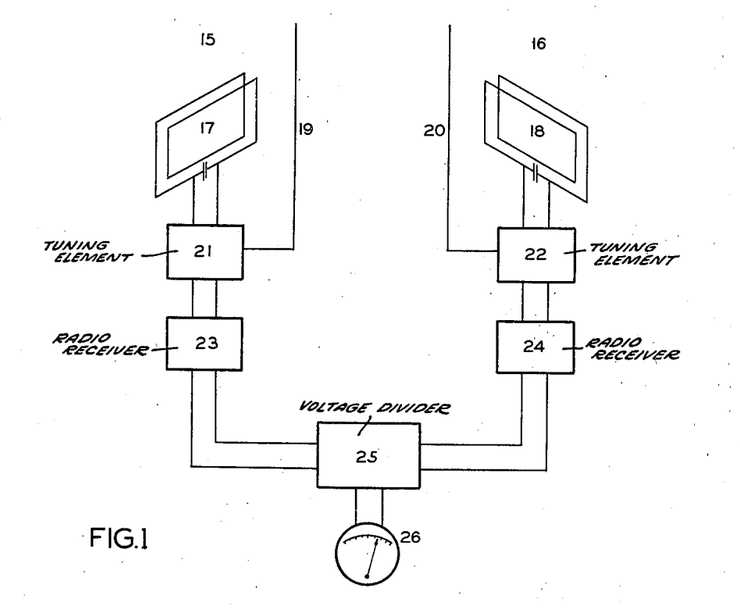
Fig. 1 shows an arrangement for automatically indicating the direction of a course with regard to a radio transmitting station.

Referring now more specifically to Fig. 1 of the drawings, two directional antennae, 15 and 16, angularly displaced with respect to each other, are fixedly mounted in any suitable manner on any desired type of craft. The antennae 15, 16 consist of loops 17 and 18 respectively connected to non-directional antennae 19 and 20, the absorbing power of the non-directional antennae being adjusted to produce the well known cardioid patterns.

The loops are in such a position that a line bisecting one of the angles formed by the intersection of the planes of the loops is coincident with or parallel to the keel line of the vessel, and for each angular relation the loops should be spaced so as to have no inductive reaction on each other. Under such conditions each loop will absorb an equal amount of signal energy emanating from a transmitting source, if the source is located on a line bisecting one of the angles formed by the two loops and will impress equal potentials upon their respective amplifiers.

Antennas 15 and 16 are connected to respective tuning systems 21, 22 which, in turn, are coupled to radio receivers diagrammatically indicated by 23, 24, respectively, each radio receiver comprising means for obtaining tuned radio frequency amplification, detection and audio amplification. Radio receivers have a constant and equal input-output relationship over a wide range of input voltages. The output circuits of the receivers 23 and 24 are respectively connected to a voltage dividing device 25. The latter is connected to an indicating meter 26.

The voltage dividing device 25 will be subsequently described in connection with Fig. 8. It is arranged in such a manner that the output terminals connected to the indicator 26 produce a voltage which represents the ratio of the input voltages, derived respectively from the receivers 23 and 24.

Figure 2:
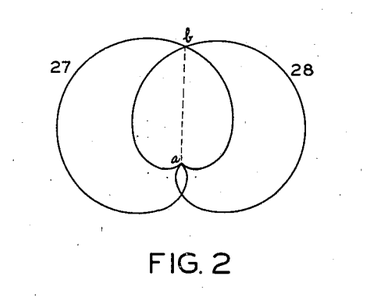
Fig. 2 shows a diagram explanatory to Fig. 1.

The operation of the arrangement of Fig. 1 will be better understood if reference be made to Fig. 2. Fig. 2 represents the directional responsivity of antennas 15 and 16 in form of polar cardioid diagrams 27 and 28.

Assume now that the vessel is headed for the radio beacon and the loops 17, 18 of the antennas 15, 16 are symmetrically placed with respect to the keel line. Then the antennas will absorb equal amounts of signal energy. In Fig. 2 the amount of energy absorbed by the antenna 15 will be represented by the segment $ab$ in the cardioid pattern 27 and the amount of energy absorbed by the antenna 16 will be equally represented by the same segment $ab$ in the cardioid pattern 28. The receivers 23 and 24 respectively connected to the antennas 15, 16, will consequently deliver equal voltages to the electronic divider 25 and the output of the electronic divider will indicate at the meter 26 the value of the ratio equal to one.

It is obvious that with the arrangement as described, the responsiveness of the two antennas remains equal as long as the airplane is headed directly forward or away from the station and the value of the ratio indicated by 26 will be one.

If the airplane veers away from the heading, there is an increase in responsiveness in one of the antennas and a corresponding decrease in the other antenna. In that connection it is important to note that the ratio of responsiveness of the two antennas remains constant for any given bearing, irrespective of the signal strength or distance from the station. This permits calibrating the instrument dial 26 in degrees—an important feature of the present invention. A navigator will thus be instantaneously and automatically informed that his vessel has deviated to the left or right side a definite number of degrees from its previous "head-on" course.

It is therefore apparent that I have provided a radio compass indicating automatically and continuously in degrees the direction of the course with reference to a fixed radio transmitting station.

An additional and important feature of my invention consists in providing three or more radio compasses of the type shown in Fig. 1, tuning each of the radio compasses to a different frequency and thus providing three separate indications giving the direction of the course with reference to three different radio transmitting stations. By means of these indications and with the aid of an appropriate navigational chart it is possible to determine instantaneously the position of the craft in a manner that shall be explained hereafter.

Figure 3:
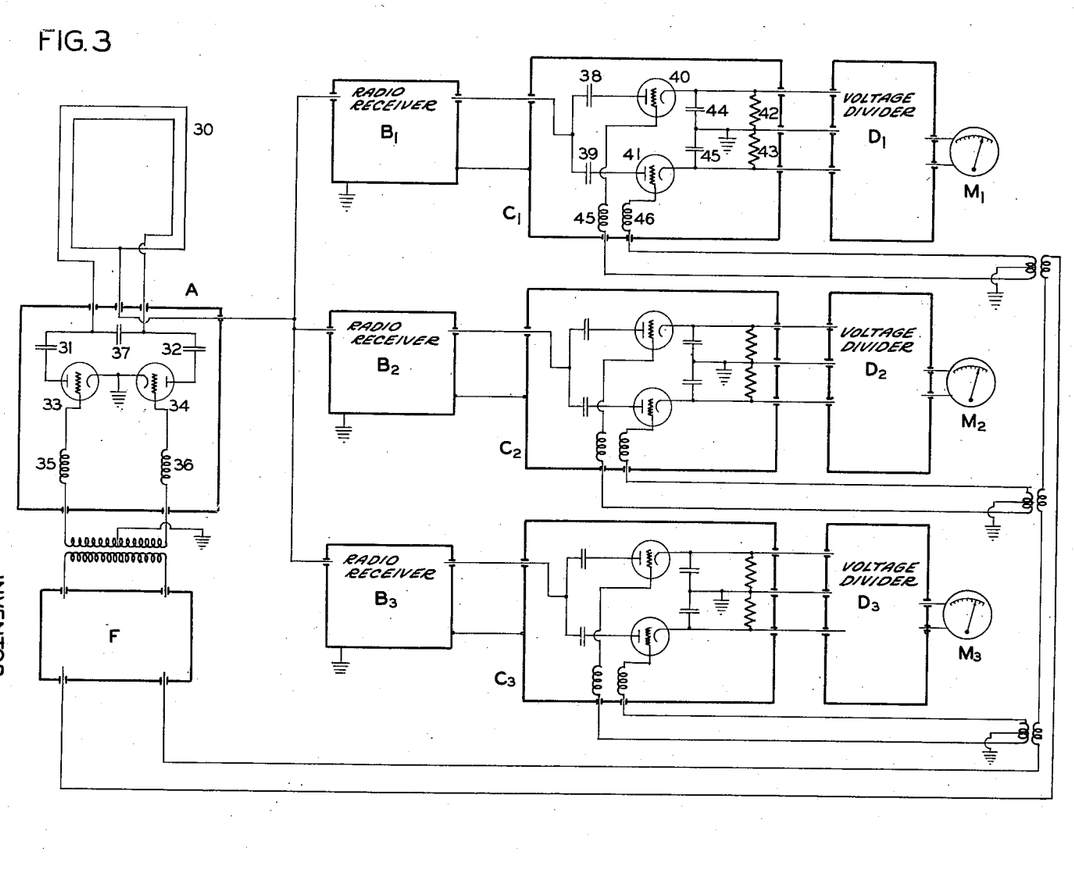
Fig. 3 shows a modified arrangement for automatically indicating the direction of a course with regard to a plurality of radio transmitting stations.

Fig. 3 represents another embodiment of my invention comprising one antenna system connected to three separate tuning arrangements and adapted to produce angular indications in degrees of the course of the airplane with respect to three fixed radio transmitting stations.

Referring now more particularly to this figure, A is the input unit of the apparatus and comprises the directional antenna system and the switching arrangement. $B_1$, $B_2$, $B_3$ are radio receivers tuned to frequencies $f_1$, $f_2$, $f_3$ respectively and used for amplifying and detecting the said frequencies received on the loop antenna. $C_1$, $C_2$, $C_3$ are switching arrangements synchronized with the input unit A. $D_1$, $D_2$, $D_3$ are electronic voltage dividers respectively connected to $C_1$, $C_2$, $C_3$. $M_1$, $M_2$, $M_3$ are indicators showing angular position of the airplane course with respect to the stations transmitting the signal frequencies $f_1$, $f_2$, $f_3$. F is the synchronizing unit and supplies synchronizing voltage to the switching arrangements in A, $C_1$, $C_2$, $C_3$.

Referring to A, loop antenna 30 is connected at each terminal through blocking condensers 31 and 32, to three electrode tubes 33, 34, the filaments of which are connected together and grounded. Two equal alternating voltages, of the same frequency but opposite in phase, are applied from ground to the grids of 33 and 34 through equal radio frequency inductors 35, 36. Consequently when a positive voltage is applied to the grid of 33, a negative voltage is applied to the grid of 34 and vice versa. It is well known that when a positive voltage is applied to the grid of a suitable thermionic device, the resistance of that device is relatively low, but when a negative voltage is applied to the grid its resistance is relatively high. For this reason the ground is effectively placed at each end of the loop antenna alternately, once for each cycle of the alternating voltages supplied by the synchronizing unit F.

The voltage developed by the loop antenna is applied simultaneously to the radio receivers $B_1$, $B_2$, $B_3$ tuned respectively to frequencies $f_1$, $f_2$, $f_3$. The units $B_1$, $B_2$, $B_3$ may be radio receivers of the usual type comprising essentially a tuning element, a radio frequency amplifier, a detector, and an audio amplifier.

The circuit arrangements of $C_1$, $C_2$ and $C_3$ are similar one to another and consequently only the one shown in $C_1$ will be explained hereafter.

Referring now more particularly to the circuit arrangement $C_1$, it contains two equal capacitors 38, 39, one terminal of each being connected to the output of the radio receiver $B_1$ and the other terminal of each connected to anodes of thermionic tubes 40 and 41 respectively, which pass current only when a positive voltage is applied to the grid. The cathodes of 40 and 41 are connected to resistors 42, 43 and to condensers 44, 45 as shown in the figure. Condensers 44 and 45 are connected to ground at one terminal. The common connection between the resistors 44, 45 is equally connected to ground. The grids of 40 and 41 are supplied with equal alternating voltages of the same frequency but opposite in phase, through inductors 45 and 46. Thus when a positive voltage is applied from ground to the grid of 40, a negative voltage is applied from ground to the grid of 41 and vice versa, so that during one-half cycle of the applied alternating voltage the tube 40 is conductive while during the other half cycle the tube 41 is conductive. The switching arrangement by means of which the tubes 40 and 41 become intermittently conductive may be readily synchronized with input unit A by applying as its low-frequency alternating voltage the same voltage that is applied to unit A. Unit F accomplishes this.

Figure 4:
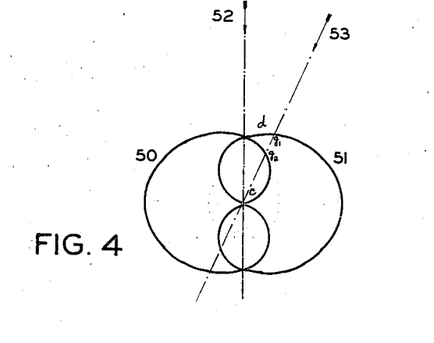
Fig. 4 shows a diagram explanatory to Fig. 3.

The operation of the arrangement will be explained in connection with Fig. 4 representing two cardioid patterns one of the said patterns corresponding to the antenna 30 grounded by means of tube 33, and the other pattern corresponding to the antenna 30 grounded by means of tube 34. The means of accomplishing this is shown in Fig. 3 in which the positive voltage from the synchronizing unit F is applied to the grid of the tube 33, a negative voltage is applied to the grid of the tube 34. Then 33 draws current and has low resistance to ground, and 34 is cut off with high resistance to ground. When the phase of the applied voltage reverses, 33 is cut off and 34 draws current, and the grounding point of the loop antenna is reversed about its center point.

Thus the field pattern of the loop antenna is both modified and reversed by grounding successively the ends of the loop antenna through tubes 33 and 34.

The displacement of the ground in the loop antenna causes the appearance of a vertical effect which superposes itself upon the signal received by the loop. Thus when the antenna is grounded through the tube 33, its pattern is represented by 50 in Fig. 4 and when it is grounded through the tube 34, its pattern is represented by 51.

When the signal being received comes from a direction indicated by the arrow 52, the voltage induced in the loop antenna will be the same for each pattern and indicated by the segment cd. Consequently the ratio of signals corresponding to each pattern will be one.

It is obvious that the strength of the signals may vary with the distance between the airplane and the transmitter but their ratio will be always equal to unity as long as the signal will come from the direction 52.

If, however, the signal comes from another direction such as indicated by the arrow 53, the voltage received by the loop antenna for pattern 51 will be $cg_1$ which is greater than for pattern 50 namely, $cg_2$, and the ratio of the signals $cg_1/cg_2$ will have a certain determined value larger than one. It is also obvious that this ratio of responsiveness will remain constant for the given direction 53 and independent of the signal strength or distance from the station.

Thus, if means be secured for measuring the relative intensity of these two signals, and determining their ratio, not only can the direction of the transmitting station be determined but also the angular deviation of the line of flight of the airplane from the direction of the transmitting station.

Remembering that when the tube 33 is conductive one loop antenna field pattern is produced and at the same time the tube 40 is conductive, and when the tube 34 is conductive another field pattern is produced and the tube 41 is simultaneously conductive, consider the effect of an incoming radio wave. When the loop antenna is grounded at one end, for instance at 33, the signal at the output of the radio receiver B, is proportional to the field pattern for that condition. This signal is applied between the common point of the condensers 38, 39 and ground and causes a current to pass through the valve 40 (which is at this instant conductive) and through the resistor 42 to ground.

If however the loop antenna is grounded at the other end i. e. at 34, the signal at the output of the radio receiver B is proportional to that condition. This signal causes a current to pass through the valve 41 (which is now conductive) and through the resistor 43 to ground.

In such a manner there appear across the resistors 42 and 43 intermittent voltages which are substantially proportional to the signals induced in the antenna for the pattern 50 and for the pattern 51. (See Fig. 4.)

The resistors 42 and 43 are shunted by the capacitors 44, 45. The latter charge themselves by the voltage across the resistors 42, 43 then discharge themselves across these resistors. Consequently across the resistors 42 and 43 there appear non-intermittent voltages which are respectively proportional to the intermittent currents passing through the tubes 40, 41 respectively. The voltages taken from the resistors 42 and 43 respectively when applied to the electronic voltage divider $D_1$ will produce across the output terminals of the electronic divider an indication corresponding to the ratio of the signals induced by the antenna for the pattern 50 and for the pattern 51. (See Fig. 4.)

This indication is transmitted to the measuring instrument $M_1$ which shows directly in degrees the location of the signal transmitting station with respect to the course of the vessel.

The arrangements designated by $B_2$, $C_2$, $D_2$, $M_2$ and $B_3$, $C_3$, $D_3$, $M_3$, are substantially alike in their structural details and in operation to the arrangements indicated by $B_1$, $C_1$, $D_1$, $M_1$. It is noted however that the radio receivers $B_1$, $B_2$, $B_3$ are tuned to different frequencies $f_1$, $f_2$, $f_3$ and $M_1$, $M_2$, $M_3$ give different indications, each of said indications corresponding to the position of a transmitting station having a frequency $f_1$, $f_2$, $f_3$ respectively.

It is therefore apparent that I have provided a system for automatically and continuously indicating the angular deviation of the course of the airplane with respect to three fixed transmitting stations.

Figure 5:
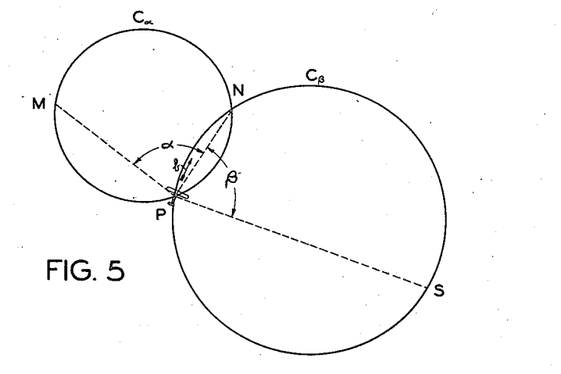
Fig. 5 shows diagrammatically the position of the airplane with respect to three transmitting stations.

Consider now Fig. 5 representing a map of the locality over which the airplane is flying. Let M, N, S designate the three fixed radio transmitting stations and P the location of the airplane and the arrow $b$ the direction of the course of the airplane at a given moment. The airplane is provided with a radio compass substantially as the one shown in Fig. 3, and adapted to give the following three indications: (1) the angle $\gamma_M$ between the direction of the arrow $b$ and the line PM; (2) the angle $\gamma_N$ between the direction of the arrow $b$ and the line PN; (3) the angle $\gamma_S$ between the direction of the arrow $b$ and the line PS. The angles $\gamma_M$, $\gamma_N$, $\gamma_S$ may be counted positively in the clockwise direction in this example $\gamma_N$ and $\gamma_S$ are positive and $\gamma_M$ is negative. These angles are smaller than 180.

The values $\gamma_M$, $\gamma_N$, $\gamma_S$ which are automatically indicated by the instrument enable to determine two angles: (1) the angle $\alpha = \gamma_N - \gamma_M$ which is subtended by the stations M and N (that is the angle MPN), and (2) the angle $\beta = \gamma_S - \gamma_N$ which is subtended by the stations N and S, that is the angle NPS.

Figure 6:
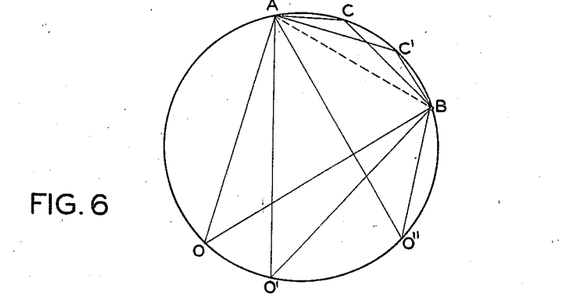
Fig. 6 shows some geometrical relationships useful for the understanding of the invention.

It is apparent that the angle α or the angle β does not fix the position of the airplane but gives a position circle $C_α$ or $C_β$ as shown. This results from a proposition which proves that in the arc AOB of any circle AOBC (Fig. 6) all the angles AOB, AO'B, AO''B, etc., are equal to one another. Similarly, all the angles on the other side of the chord AB, such as ACB, AC'B, etc., will be equal to one another but will not be equal to AOB unless AB be the diameter of the circle.

If therefore in Fig. 5 the angle α subtended by M and N be found to be 60°, then the ship must lie somewhere on the circumference of the circle passing through the points M, N this circle being such that any point of its circumference is subtended by the points M and N at an angle of 60°.

If on the other hand the angle β subtended by N and S is 65°, then the ship must lie somewhere on the circumference of the circle passing through the points N, S, and P, this circle being such that any point on it is subtended by the points M and N at an angle of 65° or 180°–65°. Since the position of the ship must lie on both these circles, it will be an intersection P, the other intersection being the common station N.

Figure 7:
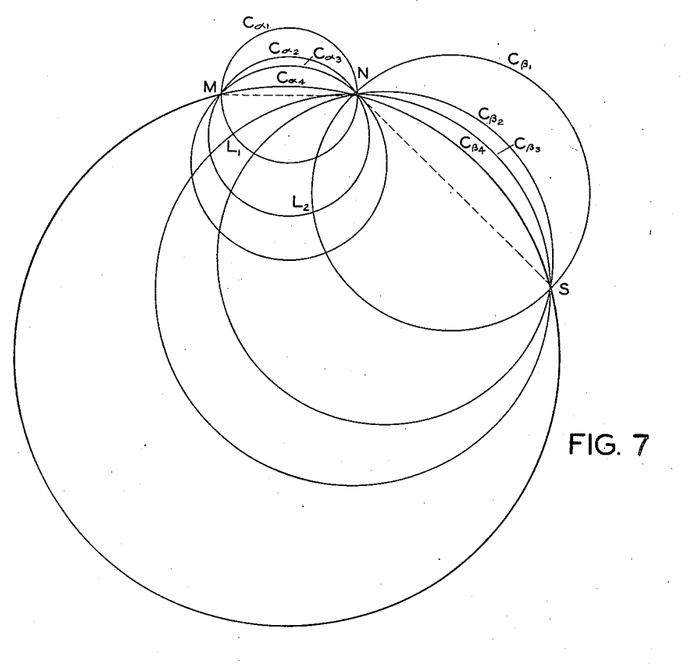
Fig. 7 shows some angular relationships referring to the position of a point with respect to three fixed points.

In accordance with the present arrangement the pilot has also before him a map of the territory over which he is flying and which indicates the angular relation of various geographical locations with respect to the fixed points M, N and S. The map is shown in Fig. 7 and comprises the three fixed reference points M, N, S a pattern of circles $C_{α_1}$, $C_{α_2}$, $C_{α_3}$ etc. passing through the points M, N and a pattern of circles $C_{β_1}$, $C_{β_2}$, $C_{β_3}$, etc. passing through the points N, S. Each of the circles $C_{α_1}$, $C_{α_2}$, etc. being such that any point on its circumference is subtended by the points M and N at an angle $α_1$, $α_2$, etc. respectively, and each of the circles $C_{β_1}$, $C_{β_2}$, etc. being such that any point on its circumference is subtended by the points N and S at an angle $β_1$, $β_2$, etc., respectively.

Any geographical location shown on the map coincides with the intersection point of a circle $C_α$ with a circle $C_β$ and such a geographical location can be identified by the angular coordinates α and β. For instance the location $L_1$ shown in Fig. 7 has as angular coordinates $α_1$, $β_3$ i. e. the point $L_1$ is subtended by M and N at an angle $α_1$, and by N and S at an angle $β_3$. In the same manner the angular coordinates of another location $L_2$ are $α_3$, $β_1$ i. e. the point $L_2$ is subtended by M and N at an angle $α_3$ and by N, S at an angle $β_1$.

On the other hand in order to identify a location having as angular coordinates the values α and β the pilot has to refer to his map and to determine the point of intersection of the circles $C_α$ with the circle $C_β$.

It is now apparent that the present invention will enable the pilot to be aware of his exact location at any instant during the flight.

Consider now the electronic divider designated by blocks 23 and 24 in Fig. 1 and by blocks $D_1$, $D_2$, $D_3$ in Fig. 3. Either of these blocks represents a transducer provided with two pairs of input terminals and one pair of output terminals and adapted to produce across the output terminals a voltage representing the ratio of the two input terminals. In order to understand better my invention, I am including hereafter a diagram of an electronic divider, shown in Fig. 8 and some explanatory remarks referring to Fig. 8.

Figure 8:
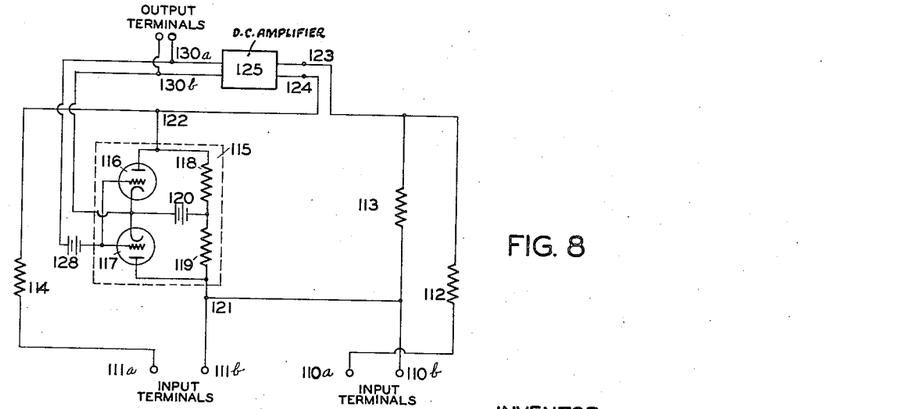
Fig. 8 shows diagrammatically an electronic voltage divider which constitutes one of the elements in the arrangements shown in Fig. 1 and in Fig. 3.

It is understood that my invention refers to my invention substantially as shown in Fig. 1 and Fig. 3 and that Fig. 8 refers only to one of the elements of Figs. 1 and 3, and namely to the electronic divider.

Briefly, in Fig. 8 numerals 110a, 110b and 111a, 111b designate two pairs of input terminals and the numerals 130a, 130b designate the output terminals of an electronic divider. As stated above, an electronic divider is adapted to produce across its output terminals a voltage, representing substantially the ratio of voltages, applied respectively across the input terminals 110a, 110b and 111a, 111b. The input terminals 110a, 110b are connected to a circuit consisting of a resistance 112 in series with a resistance 113. The input terminals 111a, 111b are connected to a circuit consisting of a resistance 114 in series with a circuit arrangement designated by a block 115, the said circuit arrangement comprising two three electrode tubes 116 and 117 connected in push-pull, two resistors 118, 119 connected across the anodes of the tubes 116, 117 respectively and a battery 120 inserted between the cathodes of the tubes 116, 117 and the common terminal of the resistors 118, 119 respectively. The terminal 121 of 115 is connected directly to one of the terminals of 113 while the other terminal of 113 and the terminal 122 of 115 are respectively connected to the input terminals 123, 124 of a D. C. amplifier 125. The D. C. amplifier 125 is of a push-pull type well known in the art. One of the output terminals of the amplifier 125 is connected to the cathodes of the tubes 116, 117 and the other output terminal of 125 is connected through the battery 128 to the grids of the tubes 116, 117.

The operation of this arrangement can be explained as follows:

Let R designate the resistance of 112 or 114, these two resistances being equal one to another and let $r_1$ designate the resistance of 113. The electric circuit contained in the block 115 and inserted between the terminals 121, 122 acts primarily as a resistance; let the latter be represented by $r_2$. It is apparent that the value of $r_2$ depends among other things upon the plate-cathode resistances of the tubes 116 and 117. On the other hand, the plate cathode resistances of the tubes 116, 117 are functions of their grid biases, the latter being determined by the voltage between the terminals 130a, 130b.

Consequently the voltage between the terminals 130a, 130b can be used for controlling the equivalent resistance $r_2$ of the block 115 and the magnitude of this voltage determines the value of the resistance $r_2$.

The current flowing from the terminal 110a into the resistor 112 in series with the resistor 113 and returning to the terminal 110b can be expressed as follows:

$$i_1 = \frac{E_1}{R+r_1} \quad (1)$$

Assuming that $r_1 \ll R$ the expression (1) reduces to $$i_1 = \frac{E_1}{R} \quad (2)$$

and the voltage across the terminals of the resistance 113 can be expressed as follows:

$$v_1 = i_1 r_1 = \frac{E_1 r_1}{R} \quad (3)$$

In a similar manner, the current flowing from the terminal 111a into the resistor 114 and traversing the block 115 from the terminal 122 to the terminal 121 and entering into the terminal 111b can be expressed as follows:

$$i_2 = \frac{E_2}{R+r_2} \quad (4)$$

Assuming that $r_2 \ll R$ the expression (4) reduces to $$i_2 = \frac{E_2}{R} \quad (5)$$

and the voltage across the terminals 122 and 121 becomes $$v_2 = i_2 r_2 = \frac{E_2 r_2}{R} \quad (6)$$

The voltages $v_1$ and $v_2$ oppose each other in such a manner that the voltage $v_3$ across the input terminals 123, 124 of the D. C. amplifier 125 is equal to the difference of $v_1$ and $v_2$ i. e.

$$v_3 = v_1 - v_2 = \frac{1}{R}[E_1 r_1 - E_2 r_2] \quad (7)$$

and the amplified voltage across the output terminals 130a, 130b of the D. C. amplifier is $$v_4 = K v_3 = \frac{K}{R}[E_1 r_1 - E_2 r_2] \quad (8)$$

where K is an amplification factor.

The voltage $v_4$ in series with the voltage of the battery 128 constitutes the grid bias of the tubes 116, 117. It is apparent that $v_4$ determines the plate resistance of the tubes and also determines the resistance $r_2$ of the block 115. Under the conditions shown in the figure the value of $r_2$ is such as to render the expression $$v_3 = \frac{1}{R}[E_1 r_1 - E_2 r_2] \quad (9)$$

very small i. e.

$$v_3 \ll \frac{E_1 r_1}{R} \text{ and } v_3 \ll \frac{E_2 r_2}{R}$$

Assume that the expression (9) is zero, i. e.

$$\frac{1}{R}[E_1 r_1 - E_2 r_2] = 0 \quad (10)$$

whence $$r_2 = \frac{E_1}{E_2} r_1 \quad (11)$$

Let $r_1$ be equal to one ohm. Then $$r_2 = \frac{E_1}{E_2} \quad (12)$$

It is thus seen from the formula (12) that the magnitude of the resistance $r_2$ numerically expresses the ratio of the voltages $E_1$ and $E_2$. Consequently the problem of determining the ratio of voltages across the terminals 110a, 110b and 111a, 111b is equivalent to determining $r_2$, i. e. the equivalent resistance of the block 115 between the terminals 121 and 122. On the other hand the value of $r_2$ is controlled and determined by the voltage $v_4$ across the output terminals 130a, 130b. Consequently in the expression (12) instead of measuring the value $r_2$ expressing the ratio $E_1/E_2$ it is sufficient to determine the voltage $v_4$ which corresponds to the given value of $r_2$, the said voltage $v_4$ being measured across the output terminals 130a, 130b.

If now the relative values of the voltages $E_1$ and $E_2$ change the voltage across the output terminals 130a, 130b will indicate a new value of the ratio $E_1/E_2$ and, in general, in case of varying input voltages the voltage across the output terminals 130a, 130b will indicate automatically and continuously the instantaneous value of their ratio.

Assume for instance that the voltage $E_2$ increases and the voltage $E_1$ is maintained constant. Then the current $i_2$ and the voltage $v_2$ will also increase, and will cause a corresponding variation of the voltage $v_3$. Then the amplified voltage $v_4$ derived from the output terminals of 125 changes its value in such a manner as to cause a decrease of the resistance $r_2$ of the block 115. Then the voltage drop $v_2$ across the resistor $r_2$ becomes again substantially equal to the voltage drop $v_1$ across the resistor $r_1$ so that the relation (10) is substantially satisfied. It should be noted, however, that in this case the resistance $r_2$ has a different and a smaller value which corresponds to a new and a smaller value of the $E_1/E_2$. To this new value of $r_2$ corresponds the new value of $v_4$ which is directly indicated by the voltage across the output terminals 130a, 130b.

It is therefore apparent that the electrical circuit, substantially as shown and described in connection with Fig. 8 operates as an electronic divider and may be substituted in place of blocks 23 and 24 in Fig. 1 and in place of blocks $D_1$, $D_2$, $D_3$ in Fig. 3.

In view of my invention and disclosure, variations and modifications to meet individual whim or particular need will doubtless become evident to others skilled in the art, to obtain part or all of the benefits of my invention without copying the structure shown, and I, therefore claim all such in so far as they fall within the reasonable spirit and scope of my invention.

I claim:

1. A radio direction finder for determining angle of incidence of a radio wave emanating from a single source of radiation, comprising two aerials, each of the said aerials consisting of a loop associated with a non-directional antenna, means for deriving electrical signals impressed on each of said aerials by the radio wave, and an electrical network responsive to the said signals to produce an electrical current, the magnitude of which represents the quotient of magnitudes of the said signals, said quotient representing the direction of the said radio wave.

2. A radio direction finder for determining angle of incidence of a radio wave emanating from a single source of radiation, comprising two aerials, means for deriving electrical signals impressed on each of said aerials by the radio wave, and an electrical network responsive to the said signals to produce a current, the magnitude of which indicates substantially the quotient of the magnitudes of the said signals, the said quotient representing the angle of incidence of the said radio wave.

3. In apparatus for guiding an aircraft in space the combination with a plurality of radio transmitting stations of an indicating means on said aircraft for automatically and continuously indicating the directions at which the said radio transmitting stations are located, said indicating means comprising at least two directional antennae, means for continuously and simultaneously deriving electrical effects impressed on each of said antennae by each of the said radio transmitting stations, electrical means to automatically indicate quotients of magnitudes of the electrical effects, each quotient corresponding to two effects impressed on the two antennae and derived from one transmitting station, the said quotients representing directions at which the transmitting stations are located.

4. A radio direction finder for indicating the direction of a radio wave comprising a pair of crossed pick-up coils mounted at a predetermined angle with each other for receiving directionally the said wave and an electrical network connected to the said pick up coils for producing a current, the magnitude of which represents the quotient of the magnitudes of the signals derived from the said pick up coils, a meter for indicating the magnitude of the said current as a measure of the said direction.

5. The method of determining angle of incidence of a radio wave which consists in producing two electrical signals, each of the said signals depending upon the intensity of the said radio wave, producing an electrical current representing a functional relationship between the intensities of the said signals, the said functional relationship depending upon the angle of incidence of the said radio wave and remaining constant when the strength of the said wave varies, and determining the intensity of the said current as a measure of the said angle of incidence.

6. The method of determining angle of incidence of a radio wave, which consists in receiving two components of the said radio wave with respect to two different directions, producing an electrical current representing a functional relationship between the magnitudes of the said components, the said functional relationship depending upon the direction of the said radio wave and remaining constant when the strength of the said wave varies, and determining the intensity of the said current as a measure of the said angle of incidence.

7. The method of determining angle of incidence of a radio wave which consists in producing intermittently two electrical signals depending upon the direction and the intensity of the said radio-wave, and producing an electrical signal representing a functional relationship between the intensities of the said signals, the said functional relationship depending upon the angle of incidence of the said radio wave and remaining constant when the strength of the said wave varies.

8. The method of indicating the direction from a point to a source of electromagnetic waves which includes generating by induction separate electric currents each of which has a fixed relation with the intensity of electromagnetic waves, amplifying said currents, producing from the said currents another electric current having a fixed relation with the direction of the electromagnetic waves, and remaining constant when the intensity of said waves varies, and determining the direction from the said point to the said source as a measure of the strength of the said other electrical current.

9. The method of determining angle of incidence of a radio signal which comprises receiving two components of the said radio signal with respect to two different directions, producing an electrical current representing substantially the quotient of the magnitude corresponding to one of the said components divided by the magnitude corresponding to the other component and determining the intensity of the said current as a measure of the said angle of incidence.

10. In a method of determining the position of a craft in a radio-field the step which consists in collecting two electrical signals from the said radio-field and in producing an electrical current the magnitude of which represents substantially the quotient of the magnitude dependent upon one of the said electrical signals divided by the magnitude dependent upon the other electrical signal.

11. In a method of guiding a craft in a radio-field the step which consists in collecting intermittently two electrical signals from the said radio-field and in producing an electrical current representing substantially the quotient of the magnitude dependent upon one of the said electrical signals divided by the magnitude dependent upon the other electrical signal.

12. The method of determining angle of incidence of radio signal which consists in receiving intermittently two components of the said signal with respect to two different directions and producing an electrical signal representing substantially the quotient of the magnitude corresponding to one of the said components divided by the magnitude corresponding to the other component.

13. In an apparatus for indicating angle of incidence of an incoming radio signal, means for receiving the said signal and for producing two electrical currents depending upon the said signal, an electrical network responsive to the said two currents for producing another electrical current the magnitude of the said other electrical current representing a functional relationship between the magnitudes of the first said currents, the said functional relationship depending upon the direction of the said incoming signal and remaining constant when the strength of this signal varies.

14. In an apparatus for indicating angle of incidence of a radio signal, means for receiving two components of the said radio signal with respect to two different directions and an electrical network for producing an electrical current the magnitude of which represents substantially the quotient of the magnitude corresponding to one of the said components divided by the magnitude corresponding to the other component.

15. An apparatus for determining the position of a craft in a radio-field comprising means for collecting two electrical signals from the said radio-field and an electrical network for producing an electrical current the magnitude of which represents substantially the quotient of the magnitude dependent upon one of the said electrical signals divided by the magnitude dependent upon the other electrical signal.

16. An apparatus for determining the position of a craft in a radio-field comprising means for intermittently collecting two electrical signals from the said radio-field and means for producing an electrical current representing substantially the quotient of the magnitude dependent upon one of the said electrical signals divided by the magnitude dependent upon the other electrical signal.

17. An arrangement for guiding a craft comprising a fixed radio-transmitting station on ground and means located in the craft for producing intermittently two electrical signals dependent upon the radio-waves received from the said transmitting station and a means, located on the craft, for producing an electrical current representing substantially the quotient of the magnitude dependent upon one of the said electrical signals divided by the magnitude dependent upon the other electrical signal.

18. In an apparatus for determining angle of incidence of a radio signal, an aerial, a switching arrangement in the said aerial, means for actuating the said switching arrangement to impart successively and recurrently two different directional characteristics upon the said aerial, means for receiving successively and repeatedly two electrical signals induced in the said aerial, the said signals corresponding respectively to the said two directional characteristics, means for producing an electrical current representing substantially the quotient of the magnitude dependent upon one of the said signals divided by the magnitude dependent upon the other signal.

JACOB NEUFELD.